United States Statutory Invention Registration [19]

[11] Reg. Number: H242

Eng

[43] Published: Apr. 7, 1987

[54] METHOD OF KEYING OUTER BEARING RACE TO HOUSING

[75] Inventor: Patrick S. Eng, Germantown, Md.

[73] Assignee: The United States of America as represented by the Secretary of the Navy, Washington, D.C.

[21] Appl. No.: 887,464

[22] Filed: Jul. 8, 1986

[51] Int. Cl.[4] ..... B23P 19/02; F16C 35/077

[52] U.S. Cl. ..... 29/525; 29/148.4 A; 29/526 R; 384/537

*Primary Examiner*—Deborah L. Kyle
*Assistant Examiner*—Michael Carone
*Attorney, Agent, or Firm*—Kenneth E. Walden

[57] ABSTRACT

A method of securing the outer race of an anti-friction bearing in a housing recess for preventing rotation or slippage of the outer race.

6 Claims, 12 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF KEYING OUTER BEARING RACE TO HOUSING

BACKGROUND OF THE INVENTION

This invention relates generally to anti-friction bearings and, specifically, to arrangements for securing the bearing outer race in a housing recess for preventing it from rotating or slipping therein.

Numerous arrangements and methods are proposed in the art for securing the bearing outer race in its recess for accomplishing this objective. One very commonly used method of retaining the outer race in its housing recess is by providing for an interference fit between the outer race and recess. The recess is machined to an inside diameter slightly less than the outside diameter of the bearing outer race. A light axially directed force on the outer race is all that is necessary to press-fit it into position in an interference relationship with the recess so that no relative rotation or slippage occurs. While this type of interference fit is a much used method, it has limitations and disadvantages, for example, machining must be precise, and installation and removal cannot be easily accomplished. Forced removal of the outer race requires the use of a press and may damage the race or score the housing recess. Another method is thermal expansion and contraction to hold the race in position within the housing recess. This method requires precision tooling and special techniques, and can cause damage to heat treated parts or contents of the housings. Still another very commonly used method is to employ adhesive compounds between the outer race periphery and the housing recess wall. This can be accomplished by special compounds, for example, but not limited to, "Loctite". A variation of this method is disclosed in U.S. Pat. No. 3,451,736 wherein the bearing outer race is provided with serrations along its periphery, as is the housing recess wall. Plastic is injected between the facing serrations and allowed to harden, thus acting to key the parts together. Still other means are provided to establish interference between the outer race periphery and the recess wall. U.S. Pat. No. 4,549,823 teaches the use of a swellable elastomoric ring located in an annular notch about the housing recess which is adapted to expand upon exposure to petroleum-based lubricating fluid to fill the space and press against (grip) the outer race to restrain it from rotation or slippage.

These arrangements are complicated, often require special tooling to assemble, and are difficult to disassemble.

When press fits or other types of arrangements referred to herein fail, the whole outer race is inclined to rotate or spin in its housing, often leading very quickly to major damage to the bearing and housing. The basic principle of keyed arrangements, as disclosed in the several embodiments of this invention, is reliable, and does not require special tooling for assembly or disassembly.

SUMMARY OF THE INVENTION

In summary, the invention is directed to key and keyway arrangements between an outer bearing race and a housing recess for preventing rotation of the race therein.

It is, therefore, an object of the invention to provide a simple yet reliable arrangement for restraining an outer bearing race from rotating or creeping in its housing.

It is another object of the invention to provide cooperating keys and keyways between the outer race and housing recess wall to prevent rotation or creep of the race.

Other objectives of the inventions will become apparent to one skilled in the art upon considering the drawing and accompanying specification forming this application.

DETAILED DESCRIPTION OF THE PREFERRED EMBODIMENTS

Figure 1:
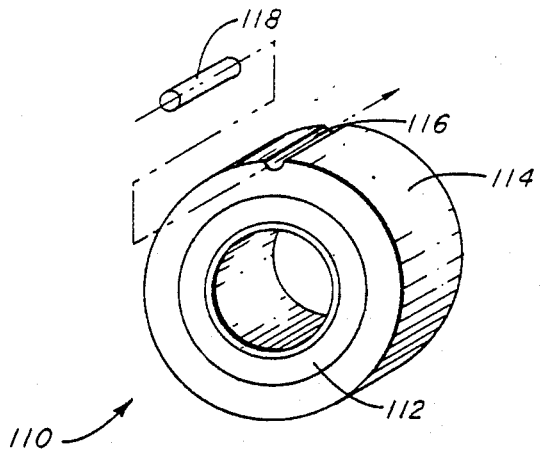
FIG. 1 is a perspective view of an anti-friction bearing and a round key adapted to be inserted in a hemi-circular keyway located on the outer race.
Figure 1A:
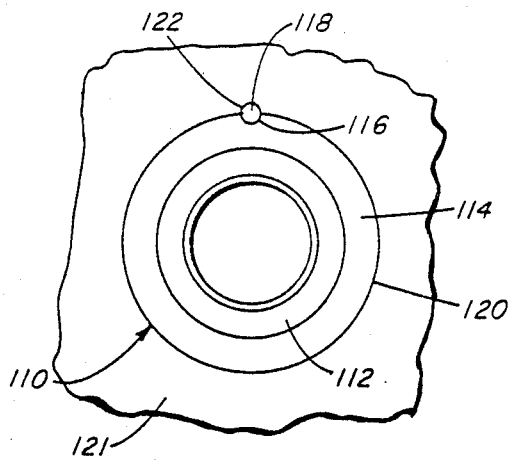
FIG. 1*a* is a end view of the antifriction bearing of FIG. 1 assembled in a housing with the key inserted into a circular keyway shared between the outer race and housing recess.

By referring now to the drawings, it will be seen that several embodiments are disclosed for retaining the outer race of an anti-friction bearing in the recess of the housing adapted to receive it. In FIG. 1 there is illustrated in perspective an anti-friction bearing 110 having an inner race 112 and an outer race 114. The outer race is provided with a notch or recess extending entirely across its axial face to define a hemi-circular keyway 116 which is adapted to receive round key 118. FIG 1*a* is a frontal view of anti-friction bearing 110 with its outer race 114 nested within cylindrical recess 120 of housing 121. A hemi-circular keyway 122, corresponding in size and shape to keyway 116 in the outer race, is located in the wall of recess 120 so that when the two keyways are positioned opposite one another they form a complete circular keyway capable of receiving key 118. In this manner outer race 114 is secured from rotation or creep within housing recess 120.

Figure 2:
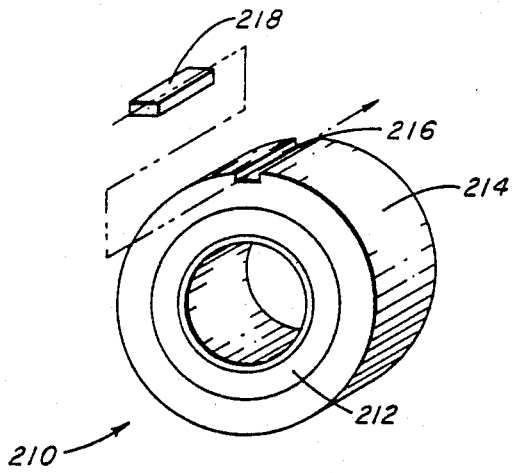
FIG. 2 is a perspective view of an arrangement similar to FIG. 1, but having a rectangular key and keyway.
Figure 2A:
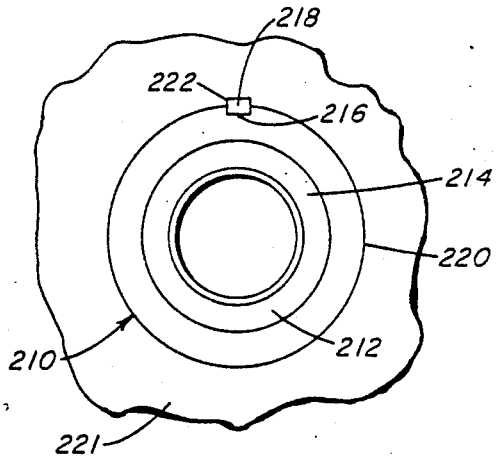
FIG. 2*a* is an assembly view similar to FIG. 1*a*, but teaching a rectangular key and keyway.

FIG. 2 illustrates an anti-friction bearing 210, substantially identical to the one in FIG. 1, having an inner race 212 and outer race 214, but with the outer race provided with a rectangular groove or slot extending entirely across its axial face to form a keyway 216 for receiving receive key 218. FIG. 2*a* is a frontal view, similar to FIG. 1*a*, illustrating bearing 210 with outer race 214 mounted in recess 220 of housing 221. Rectangular key 218 is illustrated as completely filling the complete keyway opening formed between keyways 216 and 222 when positioned opposite one another.

Figure 3:
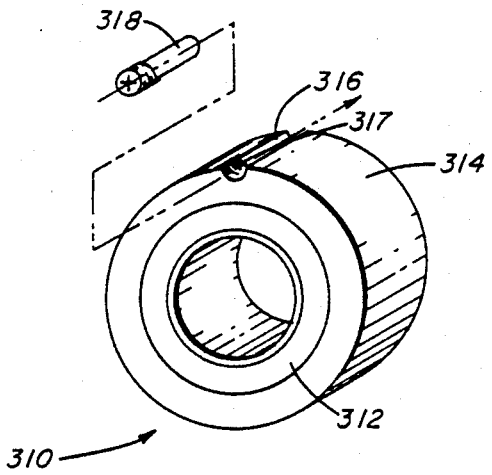
FIG. 3 is another perspective view similar to FIG. 1, but employing a round key having a threaded portion for receipt into threading in the keyway.
Figure 3A:
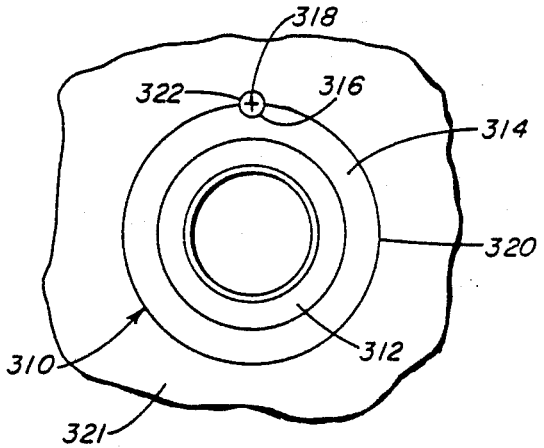
FIG. 3*a* is an end view of an arrangement similar to FIG. 1*a* illustrating the threaded key of FIG. 3 in position.
Figure 4:
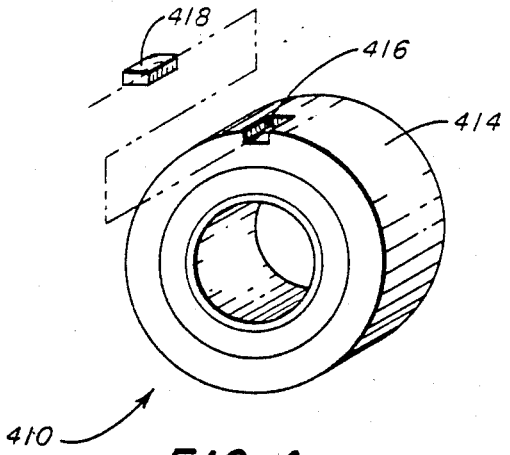
FIG. 4 illustrates an alternate key and keyway arrangement wherein both the key and keyway extend less than completely across the face of the outer race.

Another arrangement is illustrated in FIGS. 3 and 3*a* wherein a bearing 310 has its outer race 314 provided with a hemi-circular keyway similar to that illustrated in FIG. 1, however, one end 317 is threaded. When the outer race is positioned in recess 320 in housing 321 with keyway 316 opposite threaded keyway 322 in the housing, it defines a completely cylindrical keyway, one end of which is threaded. A key 318 is provided with threading at one end for mating with the threading at the entrance to the cylindrical keyway for retention therein.

Figure 5:
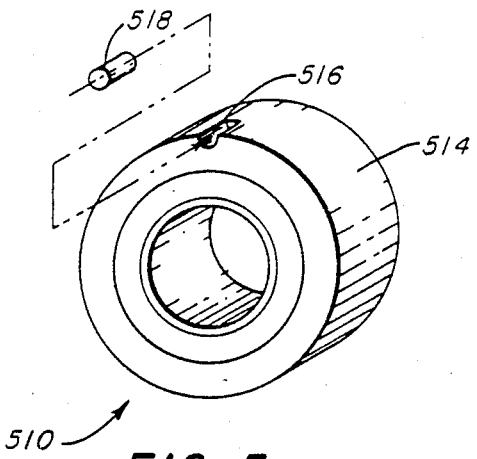
FIG. 5 illustrates an embodiment similar to the embodiment of FIG. 4 but wherein the key and keyway are circular.

FIGS. 4 through 9 illustrate six different key and keyway embodiments. In bearing 410 of FIG. 4, outer race 414 is provided with a rectangular keyway 416 which extend less than completely across its axial face. A complementary key 418 is adapted to be received in keyway 416, which as in the other FIG. 1 through 3*a* illustrations, is adapted to be positioned opposite a corresponding keyway in a housing (not illustrated in FIGS. 4–9). The bearing 510 embodiment in FIG. 5 is similar to that of FIG. 4 except outer race 514 is provided with a hemi-circular keyway 516 for receiving a key 518, both of which extend less than completely across the axial face of the outer race.

Figure 6:
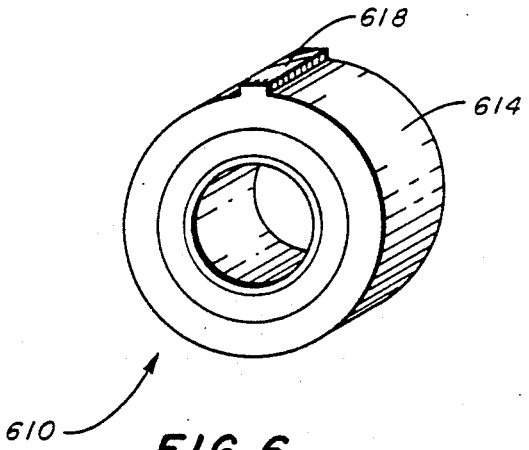
FIG. 6 illustrates an embodiment employing a rectangular key formed on the periphery of the bearing outer race.
Figure 7:
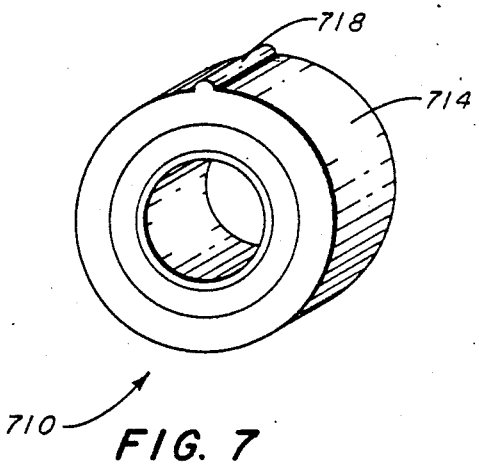
FIG. 7 illustrates an embodiment similar to FIG. 6, but wherein the key is hemi-circular.
Figure 8:
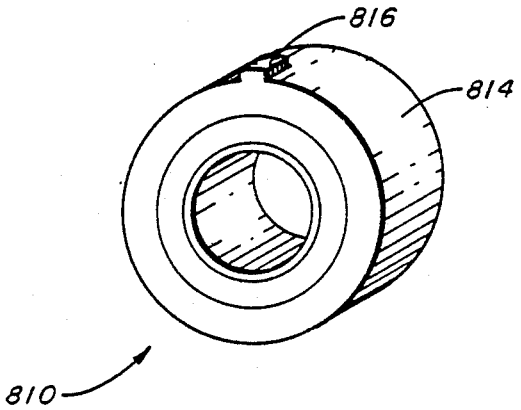
FIG. 8 illustrates an embodiment similar to FIG. 6, wherein the key extends less than completely across the face of the outer race.
Figure 9:
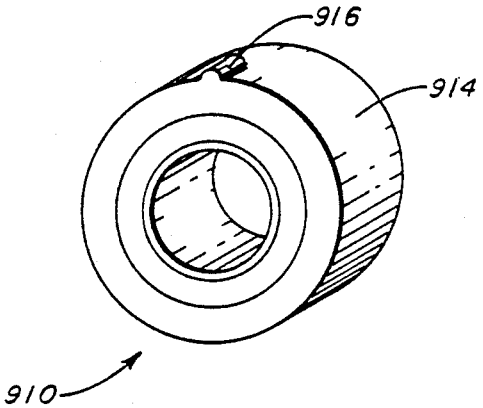
FIG. 9 illustrates an embodiment similar to FIG. 7, but wherein the key extends less than completely across the face of the outer race.

In FIGS. 6 and 7 keys 618 and 718 are formed integrally with and protruding from respective outer races 614 and 714. Complementary recesses (not illustrated) are required to be machined or otherwise provided in the housing recess wall in which the outer race is to be received. FIGS. 8 and 9 illustrate, respectively, keys 816 and 916 formed integrally with and protruding from the outer peripheral faces of outer races 814 and 914. Keys 816 and 916 are similar to keys 618 and 718, respectively, in FIGS. 6 and 7, except they are shortened in their axial extent, as are the keys and keyways in FIGS. 4 and 5.

There has been illustrated in the several drawing figures, key and keyway embodiments which effectively restrain the outer race of an anti-friction bearing from rotating or creeping in the housing recess in which mounted. These arrangements are provided to replace methods known in the art with more positive restraints and without the shortcomings as discussed hereinbefore.

While several embodiments have been disclosed, it will be appreciated that deviations can be made therefrom without departing from the spirit of the invention which is encompassed in the claims annexed hereto.

What is claimed is:

1. A method of securing the outer race of an anti-friction bearing in a cylindrical recess of a housing for preventing axial rotation of the race therein comprising the steps of:

providing means on the outer peripheral face of the outer race disposed in a direction parallel to the axis of the race;

providing means on the inner face of the housing cylindrical recess disposed in a direction parallel to the axis of the cylindrical recess; and, establishing interference between the means for preventing axial rotation of the outer race in the housing recess.

2. The method of claim 1 further defined by the steps of:

providing the means on the outer face of the outer race in the form of a radially extending protrusion; and providing the means on the inner face of the housing cylindrical recess in the form of a recess complementary to and receiving the protrusion on the outer race for preventing axial rotation of the outer race in the housing recess.

3. The method of claim 1 further defined by the step of providing means on the bearing outer race to extend less than completely across the axial extent thereof.

4. The method of preventing rotation of an outer bearing race in its housing as defined in claim 1 further defined by the step of:

providing longitudinally disposed grooves in each facing surface whereby when the grooves are located together they define an enclosed keyway; and, inserting a key in the enclosed keyway complementary to the shape thereof for providing the interference.

5. The method of claim 4 further defined by the steps of:

providing complementary threading on each the key and enclosed keyway; and inserting the key into the enclosed keyway and engaging the threading for securing the key therein.

6. A method of securing the outer race of an anti-friction bearing in a cylindrical recess of a housing for preventing rotation of the race therein comprising the steps of:

providing an elongate hemi-circular keyway on the inner face of the housing cylindrical recess extending in a direction parallel to the axis of the cylindrical recess;

providing an elongate hemi-circular keyway on the outer face of the outer race extending in a direction parallel to the axis of the outer race whereby when the keyways are adjacently disposed they form an enclosed circular keyway;

threading at least a portion of the enclosed circular keyway;

inserting into the keyway an elongate key having threading thereon; and;

engaging the threading for securing the key in the enclosed circular keyway.

* * * * *